J. B. CHANDLEY & W. WILSON.
Telescopic Handle for Canes.
No. 223,706. Patented Jan. 20, 1880.
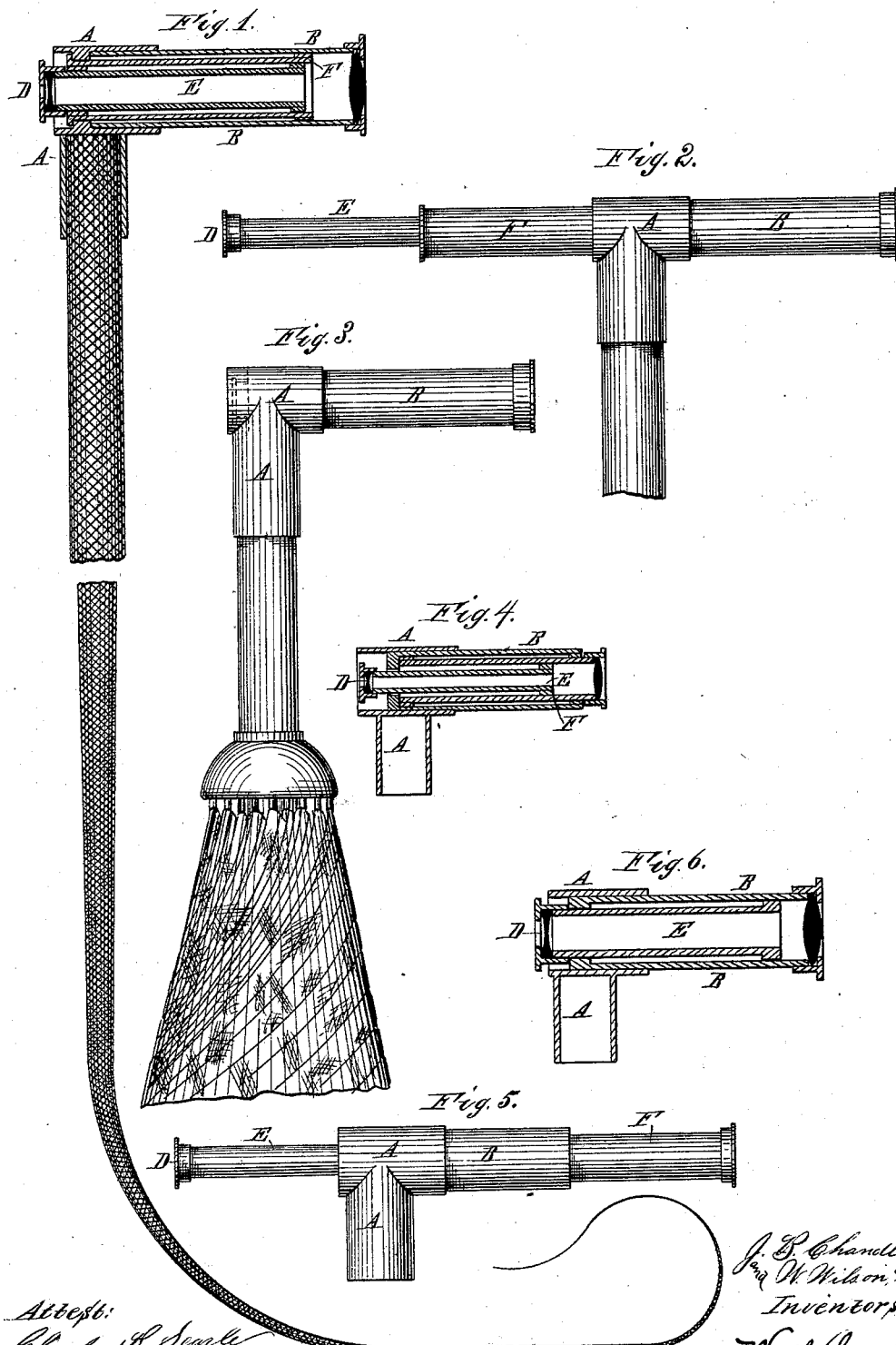

UNITED STATES PATENT OFFICE.

JOHN B. CHANDLEY AND WILLIAM WILSON, OF MOUNT KISCO, NEW YORK.

TELESCOPIC HANDLE FOR CANES.

SPECIFICATION forming part of Letters Patent No. 223,706, dated January 20, 1880.

Application filed October 16, 1879.

*To all whom it may concern:*

Be it known that we, JOHN B. CHANDLEY and WILLIAM WILSON, of Mount Kisco, county of Westchester, and State of New York, have jointly invented certain new and useful Improvements in Telescopic or Opera Handles for Canes, &c., of which the following is a full, clear, and exact description, reference being had to the accompanying drawings, and to the letters of reference marked thereon.

Figure 1 is a sectional view, illustrating our improved handle in its most approved form as applied to an ordinary riding-whip, the telescoping tube being shown as located within the casing which forms the handle. Fig. 2 is an elevation, showing the improved handle as applied to a walking-stick, the telescoping tubes being represented in their withdrawn position, as when the glass is in use; and Fig. 3 is a similar view of the same handle applied to an umbrella or parasol, the tubes being incased or closed. Fig. 4 is a sectional view of a modified form of handle having the telescoping tubes so arranged in the principal or outer casing that one may be withdrawn from one end and the other from the opposite end; and Fig. 5 is an elevation of the device shown in Fig. 4, illustrating the position of the tubes when withdrawn for use. Fig. 6 is a sectional view, showing only one withdrawable tube located within the outer casing or handle proper, as when it is desired to produce an opera-glass handle only.

Like letters of reference, wherever they occur, indicate corresponding parts in all the figures.

Our invention has relation to the handles of canes, whips, umbrellas or parasols, and like articles; and it consists, essentially, in so constructing and arranging the shell of the handle that it shall be firmly and durably connected with the article to which it is intended to be applied, and shall at the same time operate as the outer casing or jacket of a telescope, field, or opera glass, being simple and cheap in construction, and forming a valuable and desirable adjunct to the class of articles named. To accomplish this the invention involves certain new and useful peculiarities of construction and relative arrangements or combinations of parts, all of which will be hereinafter first fully described, and then pointed out in the claims.

The union of the handle with the cane or whip, &c., in a firm and durable manner is an important consideration, and this we attain by supplying a T-coupling, as at A, one branch of which (shown in a horizontal position in the several figures) is open through and through, and the other branch serves as a socket for the reception of the stick; but this T-joint, it will be observed, is not like the somewhat similar pipe-section wherein a communication is established between the two parts. The horizontal tube is complete in itself, and is closed with respect to its depending socket, so that the attachment of the handle to the stick may be made without damaging the utility of the tube for the purposes intended. This attachment may be made by use of some suitable cement, or by means of rivets or screw-threads, as may be desired.

The casing B is inserted in one end of the horizontal open tube, being made of the proper length to afford a convenient and tasty handle. The joint between the casing B and the T-section is the point most exposed to damage, and, as cheapness in the manufacture is desirable, this joint may be brazed in the well-known manner; or it might be screw-threaded, if preferred. The horizontal part of the T and the tube B might be made of one piece of metal, although the double construction is more desirable, since it affords a more convenient means of attaching or mounting the telescoping parts.

The object-lens of the telescope is secured to that end of casing B most remote from the T-joint by means of an ornamental cap, and the eye piece D is similarly secured upon the extremity of the smallest adjustable tube, E. The connecting-tube F serves to unite B and E in such manner that they are not liable to become disunited during use; and the fittings are such that when the movable tubes are closed up the eye-piece will fall within and be protected from damage by the horizontal part of the T-joint. The object-glass might be protected in a similar manner by attaching it to the second tube, F, and making this withdrawable from the end of B farthest from the T, and connecting the eye-piece with tube E, withdrawable from the opposite open end, as clearly indicated in Figs. 4 and 5. In Fig. 6 only a single movable tube is shown within the casing or handle B, and this is made to carry the eye-piece, as in the ordinary forms of opera-glasses with single barrels.

The invention is to be distinguished from that class of devices wherein a magnifying-glass is employed for giving an enlarged view of a microscopic picture and the like mounted in the handles of various articles, and serving only as curiosities or mere toys. It is designed to afford hereby a genuine and serviceable article, for use of tourists and others, in convenient form, and in connection with such accoutrements as are ordinarily carried, without adding materially to the weight or size thereof. For such uses and in such situations our improved handle, when substantially and well constructed and designed, will recommend itself for durability, convenience, and obvious utility.

It will be observed that in all the figures of the drawings the casing B, when serving the purposes of a handle only, is located upon one side of the T-joint entirely. The same purposes might be subserved by locating this T-joint at a point between the ends of tube B; but, for reasons before given, it is preferred that the parts be assembled substantially in the manner represented.

As before intimated, we are aware of the previous existence of microscropic glasses in cane-handles, &c.; and we are likewise aware that telescopic or opera glasses have before been mounted in the stem or body of the cane, &c. To these old forms we desire it understood that we make no claim; but,

Having thus fully described our invention, what we claim as new, and desire to secure by Letters Patent, is—

1. In a handle for canes, the outer casing, containing the sliding tubes and the telescope glasses or lenses, said casing being provided with a T-coupling at one end having a depending non-communicating socket for the attachment of the stick, the whole constructed and arranged to operate substantially in the manner shown and described.

2. In combination with the handle shown, the T-joint A, casing B, middle tube, F, eye-glass tube E, and the telescope-lenses, the tube E being so mounted that the eye-piece will fall within the casing when the telescope is closed, and the whole being constructed and arranged as shown and described.

In testimony that we claim the foregoing we have hereunto set our hands in the presence of two witnesses.

JOHN B. CHANDLEY.
WILLIAM WILSON.

Witnesses:
W. W. FISH,
E. W. DICKINSON.